United States Patent
Jessen et al.

(10) Patent No.: US 8,817,296 B2
(45) Date of Patent: Aug. 26, 2014

(54) BANNER PAGES GENERATED WITHIN A PRINTING SYSTEM

(75) Inventors: Robert Jessen, Berthoud, CO (US); Kristin Reischel, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 304 days.

(21) Appl. No.: 12/618,447

(22) Filed: Nov. 13, 2009

(65) Prior Publication Data
US 2011/0116122 A1    May 19, 2011

(51) Int. Cl.
*G06F 3/12*     (2006.01)
*G06K 1/00*     (2006.01)
*G06K 15/02*    (2006.01)

(52) U.S. Cl.
USPC .................... 358/1.15; 358/1.9; 358/1.16

(58) Field of Classification Search
USPC ........ 358/1.9, 1.15, 1.16; 271/3.04; 705/14.4, 705/14.32
See application file for complete search history.

(56) References Cited

U.S. PATENT DOCUMENTS

| | | | |
|---|---|---|---|
| 6,075,617 A | 6/2000 | Fischer et al. | |
| 6,267,517 B1 | 7/2001 | Noda | |
| 6,404,994 B1 * | 6/2002 | Kawai et al. | 399/6 |
| 6,591,248 B1 * | 7/2003 | Nakamura et al. | 705/14.52 |
| 7,266,590 B2 | 9/2007 | Nakaoka | |
| 7,385,717 B2 | 6/2008 | Hobbs | |
| 2004/0257606 A1 * | 12/2004 | Bergstrand et al. | 358/1.15 |
| 2007/0177207 A1 | 8/2007 | Ahmad | |
| 2008/0140500 A1 | 6/2008 | Kurkure | |
| 2008/0180720 A1 | 7/2008 | Quach et al. | |
| 2008/0313035 A1 | 12/2008 | Peeters | |
| 2009/0190164 A1 * | 7/2009 | Kumagai et al. | 358/1.15 |
| 2009/0217268 A1 | 8/2009 | Pandit et al. | |

FOREIGN PATENT DOCUMENTS

| | | |
|---|---|---|
| JP | 2002-543510 | 12/2002 |
| JP | 2003058339 A | 2/2003 |
| JP | 2004-134988 | 4/2004 |
| JP | 2005-215621 | 11/2005 |
| JP | 2006-309502 | 3/2006 |
| JP | 2009-202576 | 10/2009 |
| KR | 2002000052921 A | 3/2004 |

OTHER PUBLICATIONS

Anonymous:"Print Job Identifying Banner Sheets," IP.com Journal, IP.Com Inc., West Henrietta, NY, US. Apr. 8, 2004, XP13019683, ISSN: 1533-0001.

* cited by examiner

*Primary Examiner* — Thomas Lett
(74) *Attorney, Agent, or Firm* — Duft Bornsen & Fettig LLP

(57) ABSTRACT

Printing systems and associated methods of generating banner pages for print jobs are disclosed. A printing system in one embodiment includes a banner page system for generating the banner pages. The banner page system includes a memory that stores content representing selectable banner messages for banner pages. The banner page system further includes a page generator that receives print jobs. For each of the print jobs, the page generator selects a banner message from the stored content per print job based on criteria defined in the printing system, and generates a banner page that includes the selected banner message. Because the banner messages are selected on a per print job basis, the banner page for each print job is customized for that print job.

34 Claims, 6 Drawing Sheets

USER: JONES

JOB NAME: JOB2
DATE: JUNE 1, 2009
TIME: 2:00 p.m.

COUPON

STORE A IS OFFERING 15% OFF OF ALL GOLF EQUIPMENT. THIS OFFER IS GOOD UNTIL JUNE 7, 2009. PLEASE PRESENT THIS COUPON AT THE TIME OF PURCHASE.

USER: ANDERSON
JOB NAME: JOB3
DATE: JUNE 1, 2009
TIME: 5:30 p.m.

NOTICE

ANDERSON'S PRINT COUNT IS 1000 SHEETS FOR THE LAST 30 DAYS. THE TARGET PRINT COUNT IS 500 SHEETS. YOU MAY CONSIDER PRINTING IN DUPLEX TO CONSERVE PAPER.

DINNER SUGGESTION

HEY USER ANDERSON, ITS GETTING CLOSE TO DINNER TIME. AFTER WORK, COME OVER TO YOUR LOCAL MARKET AND CHECK OUT OUR DELI BUFFET, WHICH IS OPEN UNTIL 9:00 p.m.

BANNER PAGES GENERATED WITHIN A PRINTING SYSTEM

BACKGROUND

1. Field of the Invention

The invention relates to the field of printing systems and, in particular, to printing banner pages between print jobs.

2. Statement of the Problem

A banner page, also referred to as a separator page, is used to separate print jobs from one another after the jobs are printed. For example, when multiple print jobs are printed on a shared printer, a banner page is printed before the sheets of each print job to act as a partition between individual print jobs. A common banner page includes the user name of the person originating the print job, the name of the print job, and the date and time the job was printed. The banner page makes it clear who printed each print job so that the print jobs may be separated and delivered to the proper originators.

The banner pages are presently generated by an application running on a host system that originates the print job, or by a print driver installed between the host and the printer. The banner pages may also be generated by the printer itself. However, when the printer generates the banner pages, the printer simply fills pre-defined fields in a template with data from the print job, such as the name of the print job, a user name, and a date/time. Thus, the content of the banner pages is limited to data included in the print job.

SUMMARY

Embodiments provided herein generate banner pages within a printing system by selecting a banner message from content stored within the printing system. The content is not limited to data included within the print job, such as the name of the print job, a user name, and a date/time. The content of the banner page may include advertisements, coupons, notices, etc, that are not actually included as data of the print job. The content is stored within the printing system. When a print job is received, the printing system selects a banner message from the stored content. The printing system then generates a banner page that includes the selected banner message for the print job. This act of selecting the banner message from the stored content occurs for each print job. Thus, the banner message is customized for each print job.

One embodiment comprises a banner page system implemented within a printing system. The banner page system includes a memory that is operable to store content representing selectable banner messages for banner pages. The banner page system further includes a page generator that is operable to receive print jobs. For each of the print jobs, the page generator is further operable to select a banner message from the stored content per print job based on criteria defined in the printing system, and to generate a banner page that includes the selected banner message. The banner pages may then be printed along with the print jobs. Because the banner messages are selected on a per print job basis, the banner page for each print job is customized for that print job.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIGS. 4-6 illustrate banner pages in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
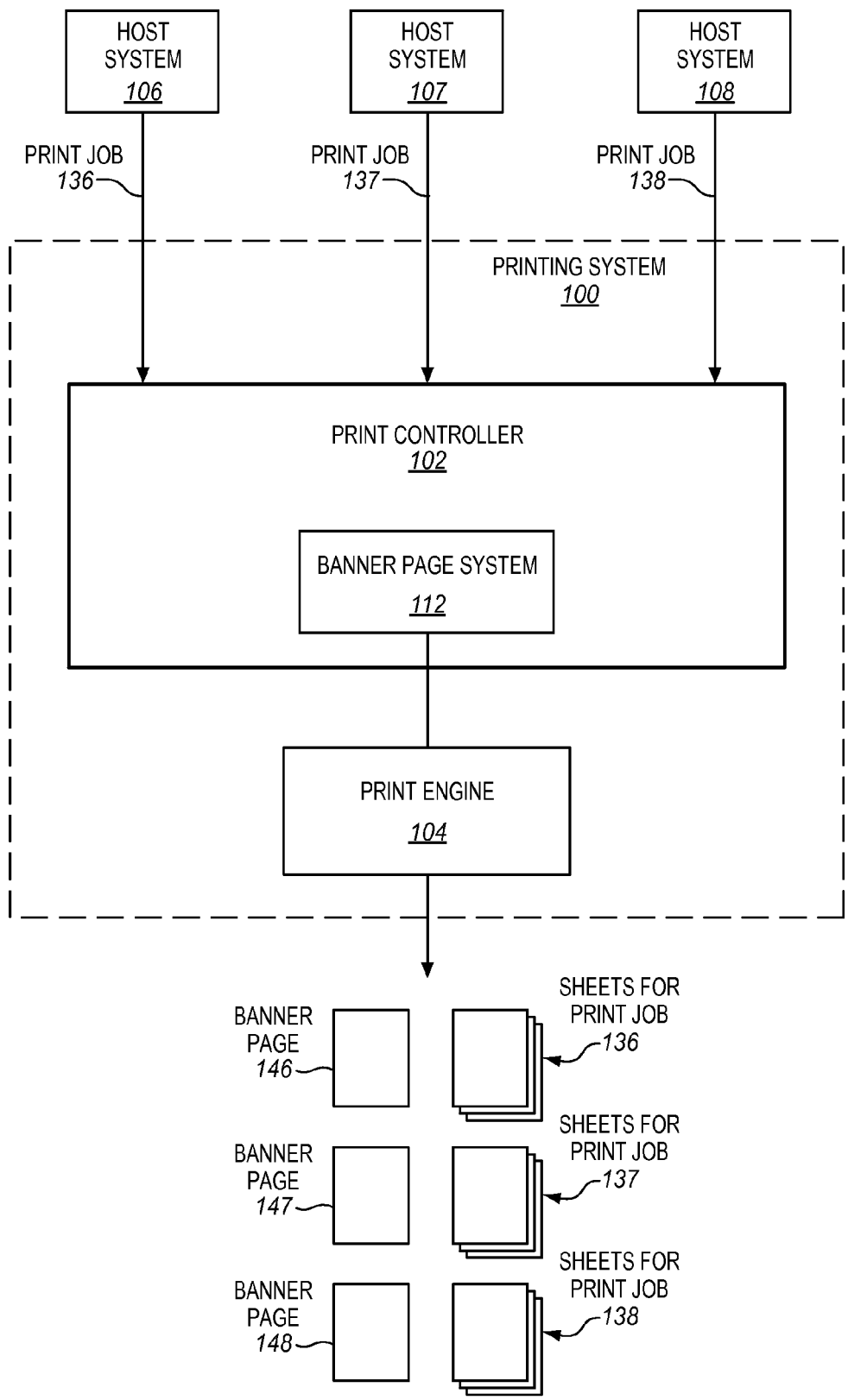
FIG. 1 illustrates a printing system in an exemplary embodiment.

FIG. 1 is a block diagram illustrating a printing system 100 in an exemplary embodiment. Printing system 100 comprises any system used to provide marks on a media, such as a continuous forms printer or a cut sheet page printer. Printing system 100 may be owned by a company or other entity, and may be shared by multiple users. In this embodiment, printing system 100 includes a print controller 102 and one or more print engines 104. Print controller 102 comprises any system, server, or components operable to interface one or more host systems 106-108 with one or more print engines 104, and to control the printing of print jobs received from the host systems 106-108 on the print engines 104. Print engine 104 comprises any system operable to provide an imaging process to mark a printable medium, such as paper. Printing system 100 may include other components or systems not shown for the sake of brevity.

In this embodiment, print controller 102 includes a banner page system 112. Banner page system 112 comprises any system, device, or component operable to define and generate banner pages for print jobs that are received in printing system 100. For example, FIG. 1 shows hosts 106-108 sending print jobs 136-138 to printing system 100. When in operation, banner page system 112 generates a banner page for each of the print jobs 136-138. Then, print controller 102 sends print job 136 and the banner page for print job 136 to print engine 104 (in bitmap form). In a similar manner, print controller 102 sends print job 137 and the banner page for print job 137 to print engine 104 along with the print job 138 and the banner page for print job 138. Print engine 104 then prints the print jobs 136-138 and their associated banner pages (shown as pages 146-148). The result shown in FIG. 1 is banner page 146 printed along with the sheets of print job 136, banner page 147 printed along with the sheets of print job 137, and banner page 148 printed along with the sheets of print job 138.

Figure 2:
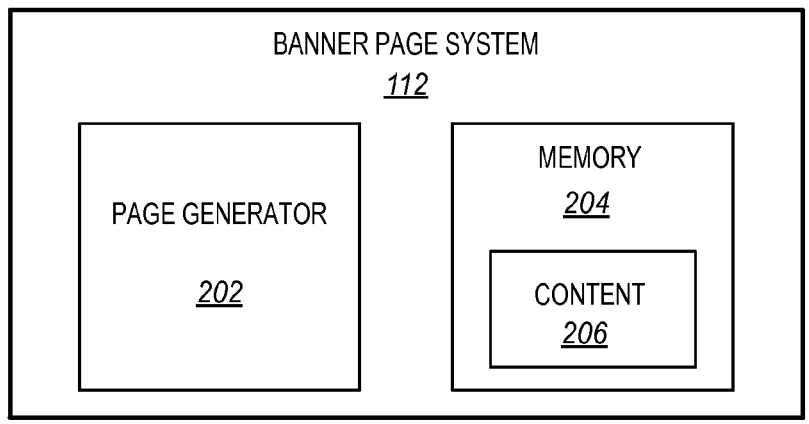
FIG. 2 illustrates a banner page system in an exemplary embodiment.

Before the banner pages 146-148 are printed, these banner pages are generated by banner page system 112. FIG. 2 illustrates banner page system 112 in an exemplary embodiment. Banner page system 112 includes a page generator 202 and memory 204. Page generator 202 comprises any system, device, or component operable to generate a banner page for a print job. As will be explained further below, page generator 202 is able to generate customized banner pages on a per print job basis. Memory 204 comprises any storage system operable to store content 206 representing selectable banner messages for banner pages.

Figure 3:
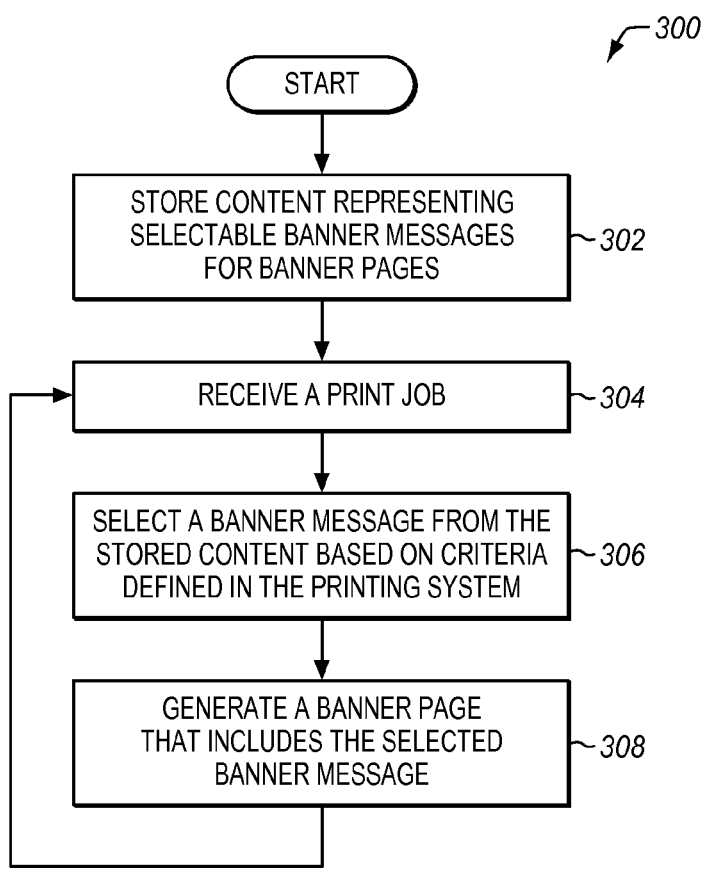
FIG. 3 is a flow chart illustrating a method of generating banner pages within a printing system in an exemplary embodiment.

FIG. 3 is a flow chart illustrating a method 300 of generating banner pages within printing system 100 in an exemplary embodiment. The steps of method 300 will be described with reference to print controller 102 in FIG. 1 and banner page system 112 in FIG. 2, but those skilled in the art will appreciate that method 300 may be performed in other systems within a printing system. Also, the steps of the flow chart in FIG. 3 are not all inclusive and may include other steps not shown, and the steps may be performed in an alternative order.

In step 302, memory 204 stores the content 206 representing selectable banner messages for banner pages. Content 206 may comprise images, text, digital pictures, bar codes, or any other data that may be selected for a banner message. In one embodiment, the content 206 may be supplied or provided by a third party (i.e., other than the owner of printing system 100), and stored in memory 204. For example, the content 206 of the third party may comprise advertisements, coupons, notifications, etc. The content 206 stored in memory 204 does not represent data from a print job that is temporarily queued for printing. The content 206 is in addition to any print job data that may be received into printing system 100, and is separate from the print job data.

In step 304, page generator 202 receives print jobs 136-138 originated by one or more host systems 106-108. The print jobs 136-138 may comprise PostScript (PS) jobs, PDF jobs, PCL jobs, PJL jobs, PPML jobs, IPDS jobs, or some other type of job. For each of the print jobs 136-138 that is received, page generator 202 is operable to define a banner page. To do so, page generator 202 selects a banner message (or multiple banner messages) from the content 206 stored in memory 204 based on criteria defined in printing system 100 in step 306. The banner message may comprise text, an image, a digital picture, or any other data that communicates information.

The criteria may comprise rules or algorithms that define what banner message to select from the stored content 206. The criteria are pre-defined before a print job is received, and may be modified as desired. The criteria may include rules that select a banner message without any variables. For example, page generator 202 may select the banner message randomly from the stored content based on the criteria. The criteria may alternatively include rules that act on one or more variables. For example, page generator 202 may select the banner message based on the criteria and metadata from the print job, such as the number of copies, the number of pages, duplex printing, n-up printing, a user name, a file name, etc. Page generator 202 may select the banner message based on the criteria and a time of day, day of the week, year, season, etc. Page generator 202 may select the banner message based on the criteria and a usage history of a user that sent the print job, such as the number of pages the user has printed on printing system 100 during a time period. Page generator 202 may select the banner message based on the criteria and a device state of printing system 100, such as a consumable supplies condition, error log, etc. Page generator 202 may select the banner message based on the criteria and print job resource information, such as the number of sheets in the print job, the ink or toner coverage used in the print job, or other resources of printing system 100 that are used to print the job. Page generator 202 may select the banner message based on the criteria and printer settings, such as enabled printer input or output features, operator panel language, or media selected. As can be seen, page generator 202 may process the criteria and a variety of other variables or information to select the banner message.

In addition to selecting the banner message in step 306, page generator 202 may transform or modify the banner message in some manner For example, assume that a selected banner message comprises an advertisement with an expiration date of two weeks. Page generator 202 may calculate the actual expiration date for the advertisement based on a present date/time, and modify the banner message to indicate the actual expiration date.

In step 308, page generator 202 generates a banner page for the print job that includes the selected banner message. The format of the banner page may be pre-defined according to one or more templates defined in printing system 100. Also, page generator 202 may select a format of the banner page based on the criteria. For example, page generator 202 may select the format of the banner page based on the criteria and metadata from the print job, time of day, day of the week, year, season, usage history of the originator of the print job, a device state of printing system 100, etc. Thus, the format of the banner page may also be selected on a per print job basis, and may be added as an additional step to method 300.

Steps 306 and 308 are performed for each individual print job that is received when a banner page is needed or desired for the print job. Thus, page generator 202 selects a banner message from the stored content 206 per print job. Page generator 202 does not merely identify text or an image that is globally used for all print jobs that are received in printing system 100, such as a company logo. Page generator 202 selects a banner message for each individual print job. Thus, the banner message is customized for each individual print job. This means that the banner messages selected for each print job may be different. However, those skilled in the art will appreciate that the same banner message may be selected for multiple print jobs depending on the criteria.

In addition to including the selected banner message in the banner page, page generator 202 may further include information from the print job in the banner page. For example, a common banner page includes the name of the user that sent the print job, the name of the print job, and the date and time the job was printed. Page generator 202 may further include the additional information from the print job in the banner page along the selected banner message. Page generator 202 may also transform or modify the additional information in some manner. For example, if the additional information includes a user name, page generator 202 may transform the user name into a full name that is more personal (e.g., user name of "SMITH" is transformed to "JOAN SMITH").

As shown in FIG. 1, banner page system 112 generates an individual banner page 146-148 for each print job 136-138 that is received. Because the banner message that is displayed in each banner page 146-148 is selected on a per print job basis, each of the banner pages 146-148 is customized. Some examples of customized banner pages are shown in FIGS. 4-6

Figure 4:
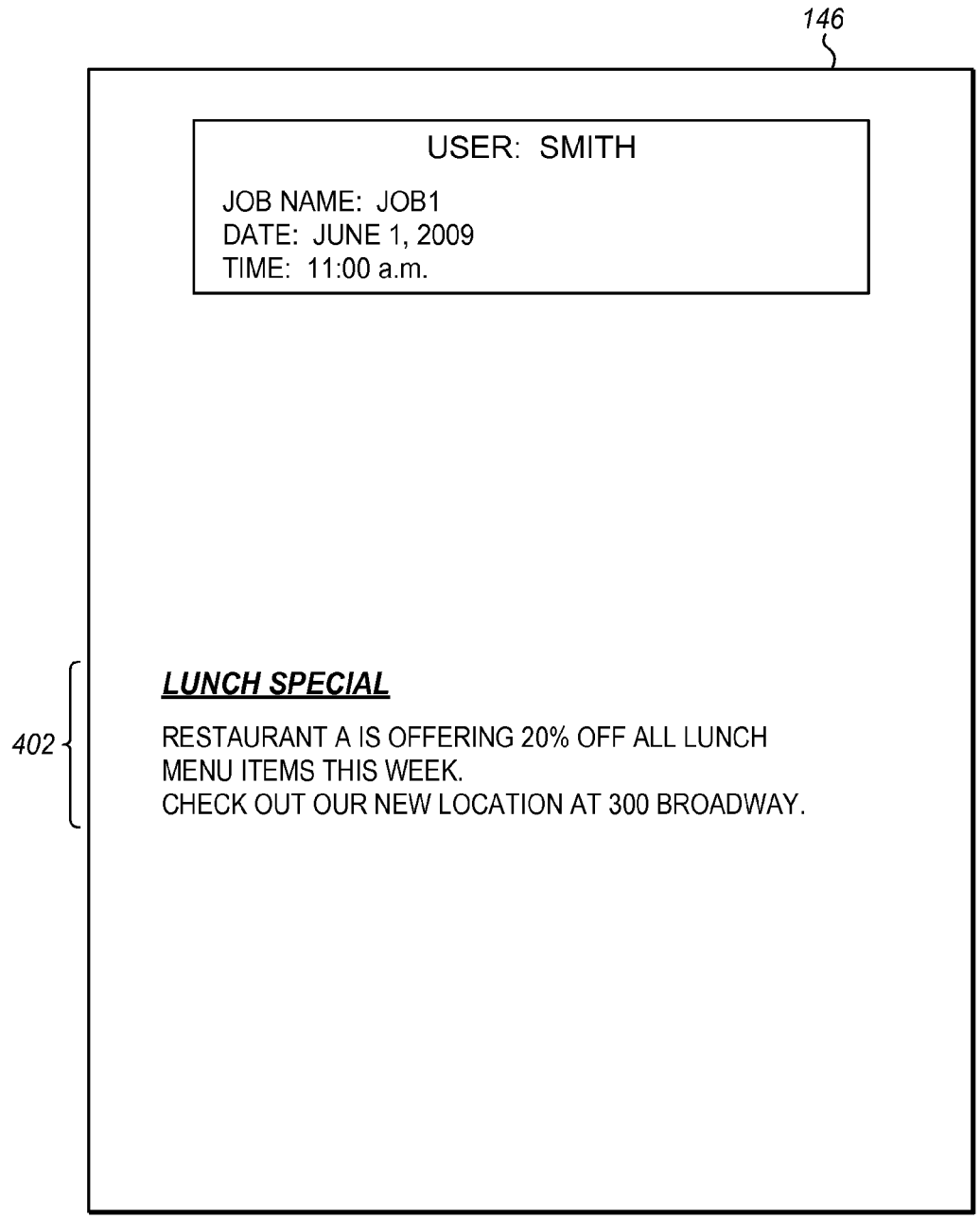
Figure 5:

FIGS. 4-6 illustrate banner pages 146-148 in an exemplary embodiment. FIG. 4 illustrates the banner page 146 generated for print job 136. Banner page 146 includes information from print job 136, such as the user name "SMITH", the job name "JOB1", and the date and time of the print job 136. Banner page 146 also includes a banner message 402 that was dynamically selected for print job 136. The banner message 402 is an advertisement for a restaurant. Banner page system 112 (see also FIG. 1) selects this advertisement based on the criteria defined within printing system 100. In this example, banner page system 112 may process the criteria and the time of day, which is 11:00 a.m., to identify an advertisement for a lunch special at the restaurant. Those skilled in the art will appreciate that banner page system 112 may select other stored content 206 to include in the banner message 402.

FIG. 5 illustrates the banner page 147 generated for print job 137. Banner page 147 includes information from print job 137, such as the user name "JONES", the job name "JOB2", and the date and time of the print job 137. Banner page 147 also includes a banner message 502 that was dynamically selected for print job 137. The banner message 502 is a coupon for a store that is selected based on the critieria. In this example, banner page system 112 may process the criteria and the date, which is June 1, to identify the coupon for golf equipment. The coupon also includes a bar code that may be scanned to redeem the coupon at the store. Those skilled in the art will appreciate that banner page system 112 may select other stored content to include in the banner message 502.

FIG. 6 illustrates the banner page 148 generated for print job 138. Banner page 148 includes information from print job 138, such as the user name "ANDERSON", the job name "JOB3", and the date and time of the print job 138. Banner page 148 also includes a banner message 602 that was dynamically selected for print job 138. The banner message 602 includes a notice from the company and an advertisement for a market. Banner page system 112 (see also FIG. 1) selects this notice and advertisement based on the critieria. In this example, banner page system 112 may process the criteria, the past usage history of "ANDERSON", and the mode of printing (i.e., simplex) to select the notice. For instance, banner page system 112 determines that Anderson has printed 1000 sheets in simplex over the last 30 days. Thus, banner page system 112 selects a notice from the company indicating the target number of sheets for Anderson, and suggesting that Anderson print in duplex to conserve paper. Also, banner page system 112 may process the criteria and the time of day, which is 5:30 p.m., to identify an advertisement for a deli at a market. Those skilled in the art will appreciate that banner page system 112 may select other stored content to include in the banner message 602.

FIGS. 4-6 show that banner page system 112 may select a variety of banner messages to include in the banner pages 146-148 based on the criteria stored in printing system 100. Banner page system 112 does not merely include information from the print jobs, such as a user name, job name, date/time, etc. Banner page system 112 selects additional content that is stored in printing system 100, and includes the additional content in the banner pages 146-148. The additional content may advantageously comprise notifications from the company, or may comprise advertisements from third parties that can generate extra revenue for the company.

Figure 7:
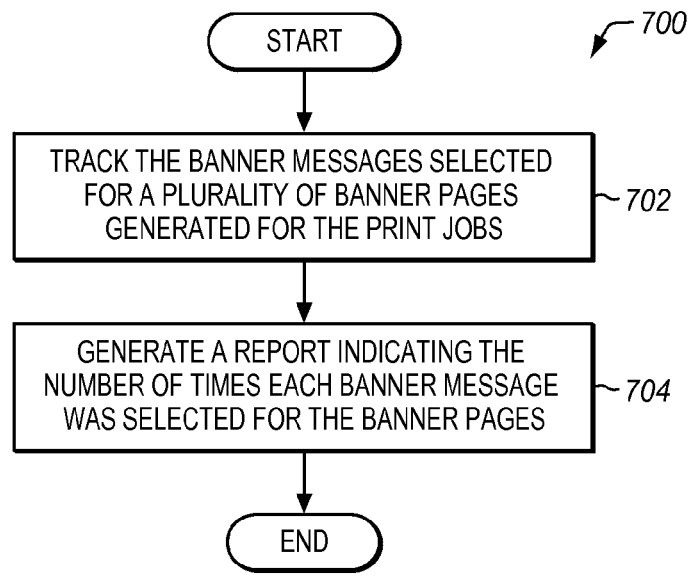
FIG. 7 is a flow chart illustrating a method of tracking content included in banner pages in an exemplary embodiment.

Because the content 206 for the banner messages may be for a third party, such as an advertiser, it may be advantageous to track what content 206 is being used in the banner pages that are printed. FIG. 7 is a flow chart illustrating a method 700 of tracking content included in banner pages in an exemplary embodiment. The steps of method 700 will be described with reference to print controller 102 in FIG. 1 and banner page system 112 in FIG. 2, but those skilled in the art will appreciate that method 700 may be performed in other systems within a printing system.

In step 702, page generator 202 tracks the banner messages selected for the banner pages generated for the print jobs 136-138. For example, assume that the stored content 206 includes 10 advertisements. Page generator 202 counts the number of times each advertisement is included as a banner message in a banner page. In step 704, page generator 202 generates a report indicating the number of times each banner message was selected for the banner pages. The report may further include a tracking time duration, dates and times of each occurrence of the banner messages, user names associated with each banner message, etc. The report may comprise a human-readable format or raw data that may be processed by a computing system or server. After the report is generated, page generator 202 may send the report to the third party or a third party system so that the third party may determine what content is being provided to the users of printing system 100.

Figure 8:
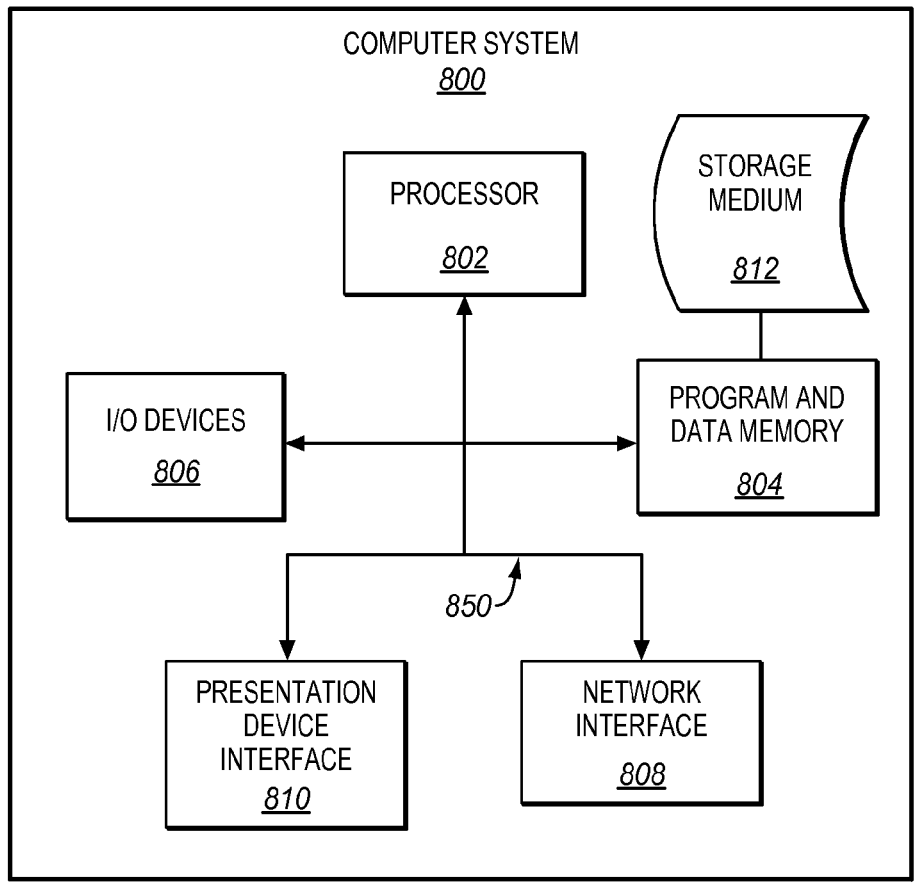
FIG. 8 is a block diagram depicting a computer system.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 8 is a block diagram depicting a computer system 800 operable to provide features and aspects hereof by executing programmed instructions and accessing data stored on a computer readable storage medium 812.

Furthermore, embodiments of the invention can take the form of a computer program product accessible from a computer-usable or computer-readable medium 812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and DVD.

A computer system 800 suitable for storing and/or executing program code will include at least one processor 802 coupled directly or indirectly to memory elements 804 through a system bus 850. The memory elements 804 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 806 (including but not limited to keyboards, displays, pointing devices, etc) can be coupled to the system either directly or through intervening I/O controllers. Network adapter interfaces 808 may also be coupled to the system to enable the computer system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be coupled to the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A banner page system implemented within a printer, the banner page system comprising:
   a memory within the printer that is operable to store a plurality of banner messages that are selectable by the printer for insertion into banner pages that are printed along with print jobs;
   a memory is further operable to store criteria that define rules for selecting the banner messages for insertion into the banner pages per print job, wherein the criteria are pre-defined in the printer; and
   a page generator within the printer that is operable to receive the print job from at least one host system;
   for each of print job received from the at least one host system, the page generator is further operable to select a banner message stored in the memory based on the criteria and based on data from a print job, and to generate a banner page that includes the selected banner message so that the banner is customized for the print job.

2. The banner page system of claim 1 wherein:
   the page generator is further operable to include additional information from the print job in the banner page.

3. The banner page system of claim 1 wherein the stored banner messages are provided by a third party.

4. The banner page system of claim 3 wherein the stored banner messages include at least one advertisement provided by the third party.

5. The banner page system of claim 3 wherein the stored banner messages include at least one coupon provided by the third party.

6. The banner page system of claim 1 wherein:
   the page generator is further operable to select an appearance of the selected banner message on the banner page per print job based on the criteria pre-defined in the printer.

7. The banner page system of claim 1 wherein:
   the page generator is further operable to select the banner message based on criteria and metadata in the print job.

8. The banner page system of claim 1 wherein:
   the page generator is further operable to select the banner message based on the criteria and a time of day/day of the week.

9. The banner page system of claim 1 wherein:
   the page generator is further operable to select the banner message based on the criteria and a usage history of a user that sent the print job to the printer.

10. The banner page system of claim 1 wherein:
    the page generator is further operable to select the banner message based on the criteria a device state for the printer.

11. The banner page system of claim 1 wherein:
    the page generator is further operable to track the banner messages selected for a plurality of banner pages generated for the print jobs, and to generate a report indicating the number of times each banner message was selected for the banner pages.

12. A method of generating banner pages within a printer, the method comprising:
    storing a plurality of banner messages that are selectable by the printer for insertion into banner pages in the printer;
    storing criteria that define rules for selecting the banner messages for insertion into the banner pages per print job, wherein the criteria are pre-defined in the printer;
    receiving the print jobs in the printer from at least one host system;
    for each print job received from the at least one host system:
       selecting a stored banner message in the printer based on criteria and based on data from a print job; and
       generating a banner page in the printer that includes the selected banner message so that the banner page is customized for the print job.

13. The method of claim 12 further comprising:
    including additional information from the print job in the banner page.

14. The method of claim 12 wherein the stored banner messages are provided by a third party.

15. The method of claim 14 wherein the stored banner messages include at least one advertisement provided by the third party.

16. The method of claim 14 wherein the stored banner messages include at least one coupon provided by the third party.

17. The method of claim 12 further comprising:
    selecting an appearance of the selected banner message on the banner page per print job based on the criteria pre-defined in the printer.

18. The method of claim 12 wherein selecting a banner message comprises:
    selecting the banner message based on the criteria and metadata in the print job.

19. The method of claim 12 wherein selecting a banner message comprises:
    selecting the banner message based on the criteria and a time of day/day of the week.

20. The method of claim 12 wherein selecting a banner message comprises:
    selecting the banner message based on the criteria and a usage history of a user that sent the print job to the printer.

21. The method of claim 12 wherein selecting a banner message comprises:
    selecting the banner message based on the criteria and a device state for the printer.

22. The method of claim 12 further comprising:
    tracking the banner messages in the printer that are selected for a plurality of banner pages generated for the print jobs; and
    generating a report in the printer indicating the number of times each banner message was selected for the banner pages.

23. A computer readable medium tangibly embodying programmed instructions which, when executed by a computer system, are operable to execute a method of generating banner pages within a printer, the method comprising:
    storing a plurality of banner messages in the printer that are selectable by the printer for insertion into banner pages that are printed along with print jobs;
    storing criteria that define rules for selecting the banner messages for insertion into the banner pages per print job, wherein the criteria are pre-defined in the printer;
    receiving the print jobs in the printer from at least one host system;
    for each print job received from the at least one host system:
       selecting a stored banner message in the printer based on the criteria and based on data from a print job; and
       generating a banner page in the printer that includes the selected banner message so that the banner page is customized for the print job.

24. The computer readable medium of claim 23 wherein the method further comprises:
including additional information from the print job in the banner page.

25. The computer readable medium of claim 23 wherein the banner messages are provided by a third party.

26. The computer readable medium of claim 25 wherein the stored banner messages include at least one advertisement provided by the third party.

27. The computer readable medium of claim 25 wherein the stored banner messages include at least one coupon provided by the third party.

28. The computer readable medium of claim 23 wherein the method further comprises:
selecting an appearance of the banner message on the banner page per print job based on the criteria pre-defined in the printer.

29. The computer readable medium of claim 23 wherein selecting a banner messages comprises:
selecting the banner message based on the criteria and metadata in the print job.

30. The computer readable medium of claim 23 wherein selecting a banner message comprises:
selecting the banner message based on the criteria and a time of day/day of the week.

31. The computer readable medium of claim 23 wherein selecting a banner message comprises:
selecting the banner message based on the criteria and a usage history of a user that sent the print job to the printer.

32. The computer readable medium of claim 23 wherein selecting a banner message comprises:
selecting the banner message based on the criteria and a device state for the printer.

33. The computer readable medium of claim 23 wherein the method further comprises:
tracking the banner messages in the printer that are selected for a plurality of banner pages generated for the print jobs; and
generating a report in the printer indicating the number of times each banner message was selected for the banner pages.

34. A printing system comprising:
a print engine operable to print on a medium; and
a print controller operable to store a plurality of banner messages in memory that are selectable for insertion into banner pages that are printed along with print jobs, to store criteria that define rules for selecting the banner messages for insertion into the banner pages per print job, wherein the criteria are pre-defined in the printer;
the printer controller is further operable to receive the print jobs from at least one host system;
for each print job received from the at least one host system, the print controller is further operable to select a banner message stored in the memory based on the criteria and based on data from a print job, and to generate a banner page that includes the selected banner message so that the banner page is customized for the print job;
the print engine is further operable to print the generated banner pages along with the print jobs.

* * * * *